Patented Mar. 27, 1945

2,372,178

UNITED STATES PATENT OFFICE 2,372,178

CONDITIONING RESIN GLUES

John F. Corwin and William Richard Moffitt, Bainbridge, N. Y., assignors to The Borden Company, New York, N. Y., a corporation of New Jersey No Drawing. Application May 1, 1942, Serial No. 441,366

6 Claims. (Cl. 260—21)

This invention relates to an improvement in the manufacture of water soluble urea-formaldehyde resin powders, and particularly in reference to the protection of such resin powders against atmospheric humidity.

One object of the invention relates to the improvement in the keeping qualities of the urea-formaldehyde resin powders from the standpoint of resistance to lumping or caking tendencies when stored in powdered form. Another object relates to the preparation of a powdered urea-formaldehyde resin free from the fault of readily absorbing atmospheric humidity which usually causes lumping in the package under usual storage conditions, and still possessing the property of easily dissolving or dispersing in water without prolonged mixing procedure.

A still further object is the production of a urea-formaldehyde resin powder possessing the desired resistance to atmospheric humidity which also possess the property of dissolving or dispersing in water to a smooth, liquid condition without excessive lumping during the mixing process.

Another object of the invention relates to the production of a resin powder which may be packed in any suitable container, and which will remain in a powdered condition during storage even though the package may be stored in a rather warm place, which conditions would liberate moisture from the resin itself in small quantities inside the package.

Another object is to produce a resin powder containing the desired catalyst necessary for hardening of the resulting resin when used and obtaining such a product which does not lump during storage conditions due to reaction of the moisture in the air attacking the catalyst and causing further polymerization of the resin mix and the lumping of same. Suitable catalysts for this purpose are dry ammonium chloride and sulphate.

Further objects will be apparent from this specification.

Commercial water soluble urea-formaldehyde resin powders are somewhat hygroscopic. This may be due in large part to the very great surface area presented by the resin in the finely powdered form, e. g. that produced by spray drying. This inherent hygroscopicity may result in the rapid absorption of moisture from a humid atmosphere. The absorbed moisture acts as a flux, having a tendency to cause the fine particles of the resin powder to coalesce into lumps, which may be tacky. This caking results in undesirable secondary properties of the resin powder, namely the inconvenience of handling such a caked powder, the slow dissolving rate in water because of the lumpy condition of same, and the resulting non-uniform, lumpy consistency of the liquid glue.

It was at first believed that this condition might be overcome by the use of various inorganic materials, which we refer to generally, as conditioning agents, one of which is a very finely powdered tricalcium phosphate. Such treatment sometimes will afford some protection, by causing somewhat less permeability of the fine resin by the air. However, the surfaces of the powders produced in this way are still exposed, and caking or lumping may occur rapidly when the moisture content of the air is large or when this varies.

We have found that urea-formaldehyde resin powders may be rendered practically immune to attack by humid atmospheres, by dry mixing into these powders relatively small proportions of water insoluble soaps of mono-hydroxy or di-hydroxy stearic acids. The use of ordinary water insoluble soaps such as stearates, palmitates, and resinates to waterproof paper, leather, textiles, gun powder, cement, face powder, and the like, is well known. Such applications, however, tend to protect the material against wetting or solution by both water vapor and liquid water. In protecting urea-formaldehyde resin powders against attack by humid atmosphere (water-vapor), on the other hand, it is absolutely essential that the protected powder must be capable of being rapidly wetted, dissolved, or dispersed by liquid water, to form the liquid glue. The soaps commonly used for waterproofing paper, leather, etc., are therefore not applicable to the protection of urea-formaldehyde resin powders because they would prevent rapid wetting and solution by liquid water.

We have found that the water insoluble soaps of mono-hydroxy-stearic acid and di-hydroxy-stearic acid, when used in the proportion of substantially 0.1% to 1% of the weight of the urea-formaldehyde resin powder have the unique property of protecting the resin powder against atmospheric humidity, while at the same time permitting rapid wetting and solution or dispersion by liquid water. But we do not restrict ourselves to the precise amounts stated.

In referring for the purposes of this invention to urea-formaldehyde condensation products, in a finely divided state, we mean to include powders such as water soluble resins of that type, which are commonly sold and used for adhesive purposes, that is to say, substantially water soluble or water dispersible types, composed wholly or principally of water soluble urea-formaldehyde condensation products. Such condensation products whose preparation we do not claim, may be prepared from urea, thio-urea, or mixtures of same by reaction with formaldehyde or its polymers; and in using the term "urea-formaldehyde resin" hereinafter in the specification and claims, we include water soluble resins made by reacting formaldehyde on urea or thio-urea or mixtures thereof. We also note that water soluble melamine-formaldehyde condensation products can be used in a similar manner. The presence of bulk-reducing agents, fillers, and catalysts, such as are frequently incorporated with urea-formaldehyde resin powder dry glue mixes does not alter the effectiveness of the hydroxy-stearate soaps. Non-polar liquids, for example mineral oils, should not be used with the hydroxy-stearates on the resin powder because we find that they reduce the effectiveness of the hydroxy-stearate soaps as water vapor repellents. The soaps which are useful in the practice of this invention are all water insoluble compounds of metallic cations with mono-hydroxy-stearic acid or di-hydroxy-stearic acid. The proportion of the acid to metal may vary; mono-acid, di-acid, or tri-acid soaps are all useful in the practice of this invention. Tri-hydroxy-stearic acid soaps may be used, but when the number of hydroxy groups per acid radical exceeds two, we find that the humidity resisting power of the soap is diminished. We accordingly prefer to use water insoluble soaps of mono-hydroxy-stearic acid, and of di-hydroxy-stearic acid the prefixes mono- and di- refer to the number of hydroxy groups per acid radical, and not to the number of acid radicals per metal atom in the soap. Although we have found that the proportion of soap may be varied widely, the most useful proportions are from 0.1% to 1.0% of soap, based on the weight of the resin powder. Less than 0.1% of the soap is usually too small a quantity to afford adequate protection against atmospheric humidity. More than 1% of the soap would often cause objectionable retardation in the rate of wetting and solution or suspension of the resin in liquid water.

The unique property of the soaps covered by this invention is that there is a range of proportions in which they provide protection against atmospheric humidity, and yet permit rapid solution by liquid water. The soap preferably should be in a finely powdered form. 200 mesh or finer gives good results. But we do not restrict the invention to this degree of fineness.

The protective agents referred to in this specification are, for purpose of brevity, referred to as "soaps."

The soap may be incorporated into the resin powder by mixing the two powders together in a suitable mixing machine e. g. a spiral mixer, or by other means, say for about a half hour. Any other efficient means of thoroughly mixing a small portion of one fine powder with a large portion of another powder, is satisfactory.

To illustrate the practice of our invention, and without restricting ourselves to the specific proportions or compositions, we cite the following examples of urea resin powder modified by addition of a hydroxy-stearate, which mixed powders have excellent resistance to humid conditions, but are rapidly dissolved or dispersed when stirred up with liquid water, in the usual proportions, to form a liquid or uniform thin pasty mass which is suitable as a plywood glue.

*Example I*

| | Pounds |
|---|---|
| Urea resin spray dried powder | 1000 |
| Aluminum mono-hydroxy-stearate (mono-acid) | 2 |

The very fine powdered resin is placed in a half ton ribbon type horizontal mixer, the soap added, the material mixed for a half hour, when the resulting product possesses the desired properties referred to above. The resin powder treated in Example I was a commercial product, particularly recommended for hot press gluing of plywood and the product contained a small percentage of finely ground wood flour, which is used as an extender. The parenthetical (mono-acid) indicates that the soap contains 1 mono-hydroxy-stearic acid radical per one atom of aluminum. This soap has the formula

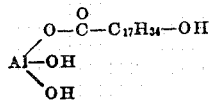

*Example II*

Same as Example I, but in place of 2 pounds of aluminum mono-hydroxy-stearate (mono) there was added 5 pounds of magnesium mono-hydroxy-stearate (di-acid), i. e. the normal salt. The procedure for mixing, etc., was exactly the same as indicated under Example I.

*Example III*

A urea-formaldehyde resin powder prepared by spray drying the liquid resin and containing the necessary catalyst or hardening agent—1000 pounds; iron di-hydroxy-stearate (di-acid)—8 pounds. The procedure of preparation was the same as explained under Example I.

The urea-formaldehyde resin powdered glue, used in Example III contained a predominant proportion of urea-formaldehyde condensation product in powder form, together with a filler, a bulk reducer, and a catalyst.

*Example IV*

1000 pounds of the resin powder as described under Example III was mixed with 3 pounds of lead mono-hydroxy-stearate (di-acid). The procedure was the same as described in the preceding examples.

The soaps above referred to are metallic salts of such hydroxy-stearic acids as contain one or two hydroxy groups. They may be normal salts or basic salts of these acids.

We have given, in the four above examples, soaps (salts) of the four metals, aluminum, magnesium, lead and iron. The insoluble hydroxy-stearic acid salts (i. e. insoluble soaps) of certain other metals can be similarly employed. Examples of such other metals are calcium, tin and zinc.

We have noted that the product as produced by the present process possesses the unique and outstanding properties disclosed in this specification. The product described is exceedingly stable under humid conditions. For example, often in the sale of a dry complete powdered urea-formaldehyde glue in small packages the user may, for household purposes, prepare a small amount of the resin glue powder for application, and retain the remainder for future use. In this operation the reclosing of the package may not be complete, so that the air from the room constantly enters the package. Under such conditions we find that the dry glue, in this semi-opened package remains for many months in its original fine, non-lumpy, and readily water soluble condition. Furthermore, if a part of the package of a 1-pound can, for example, has been used, thus leaving an air space in the can, the unused portion of the glue (treated according to the present invention) will remain perfectly free from lumps or glazing over of the surface on the top of the glue due to moisture for a long period of time, whereas the same type glue which has not been treated by our process will under these conditions absorb moisture and form a crust over the top of the dry glue in the package and will also tend to absorb sufficient moisture so that in a relatively short time in an open package the powdered glue becomes a solid chunk. Under such conditions of atmospheric reaction (including the action of atmospheric moisture) upon the glues, it is obvious that they are no longer usable. The lumps do not dissolve quickly, and in most instances apparently do not dissolve at all, and when the dry glue becomes a solid cake in the package it obviously has little or no value.

We claim:

1. A finely divided water-soluble urea-formaldehyde resin having intimately admixed therewith a water insoluble hydroxy-stearic acid metallic soap, the acid radical in said soap containing not over 2 OH groups, and the metal in said soap being one selected from the group consisting of aluminum, lead, magnesium, iron, calcium, tin and zinc, and said soap being a very minor fraction of the amount of such resin.

2. A finely divided water-soluble urea-formaldehyde resin having intimately admixed therewith a water insoluble hydroxy-stearic acid metallic soap, the acid radical in said soap containing not over 2 OH groups, and the metal in said soap being one selected from the group consisting of aluminum, lead, magnesium, iron, calcium, tin and zinc, and the amount of said soap being about 0.1% to about 1% of the former.

3. A spray dried water soluble urea-formaldehyde resin, carrying intimately admixed therewith about 0.1% to about 1% of a water insoluble hydroxy-stearic acid metallic soap, the acid radical in said soap containing not over 2 OH groups, and the metal in said soap being one selected from the group consisting of aluminum, lead, magnesium, iron, calcium, tin and zinc, and such mixture being non-lumping in moist air, but being readily miscible with liquid water.

4. For rendering a pulverulent water soluble, normally hygroscopic urea-formaldehyde composition non-lumping and permanently free-flowing, the herein described step of intimately mixing the same with a minor amount of a water insoluble hydroxy-stearic acid metallic soap, the acid radical in said soap containing not over 2 OH groups, and the metal in said soap being aluminum.

5. A finely divided water-soluble urea-formaldehyde resin having mixed therewith a very minor fraction of a water-insoluble aluminum soap of a hydroxy-stearic acid in a finely powdered condition, said soap containing not over 2 OH groups per acid radical.

6. A finely divided water-soluble urea-formaldehyde resin having mixed therewith a very minor fraction of a water-insoluble lead soap of a hydroxy-stearic acid in a finely powdered condition, said soap containing not over 2 OH groups per acid radical.

JOHN F. CORWIN.
WILLIAM RICHARD MOFFITT.